United States Patent Office 3,777,021
Patented Dec. 4, 1973

3,777,021
METHOD OF STABILIZATION OF PLANT ROOTS AND EXTRACTS THUS STABILIZED
Jacques Perrin, 40 Rue Pierret, Neuilly-sur-Seine, France
No Drawing. Filed Feb. 8, 1971, Ser. No. 113,733
Claims priority, application France, Feb. 10, 1970, 7004591
Int. Cl. A01n 3/00; A61k 27/14
U.S. Cl. 424—195                4 Claims

ABSTRACT OF THE DISCLOSURE

A method stabilization of roots and plants for the purpose of obtaining extracts of said roots, such as valerian extract in which the stabilizing process is applied as soon as the roots are gathered and in the actual places of the crops, the roots being immediately plunged into a bath of solvent such as propylene-glycol, polyol, etc., brought up to a temperature preferably at least equal to 120° C. The roots are then ground and put into a press, after which the compressed cake is mixed with propylene-glycol or alcohol at 95° containing chloroform before being again passed into the press. The various concentrates thus collected form the desired extract and correspond weight for weight to the fresh plants. The invention also specifies a medicinal association of this extract with barbiturates.

---

The present invention relates to the stabilizing process to which it is usual to subject the roots of plants from which it is desired ultimately to obtain extracts.

Plant roots generally have moisture contents greater than 75% of water, and the stabilization in question is intended to prevent the ferments which they contain from having any activity whatever capable of causing either a definitive hydrolysis of their active principles, or at least a modification of these latter, or a cellular plasmolysis, such activity being rendered possible by the large content of humidity in the said roots.

The desired stabilization is usually carried out with hot alcohol having a low boiling point under pressure. For this purpose, after collecting, washing and draining, the fresh plants are put into a special autoclave in which they are subjected to the action of superheated alcohol vapours under about a pressure of 1 kg./cm.². This alcohol becomes gradually substituted for the water inside the roots and at least in theory permits subsequent desiccation of the roots without modification or hydrolysis of their active principles.

It is however found in practice, that between a root dried after stabilization following this process and a fresh root, there already exists at least a difference of smell and flavour, which shows that there has certainly been a chemical evolution of the plant and that therefore the stabilization has been carried out too late and/or has been incomplete.

In fact, the usual method of stabilization described above necessitates a particularly heavy and complicated apparatus, constituted by a special autoclave with a recovery device and various arrangements, and such apparatus can obviously not be employed on the actual field from which the crop of roots has been taken. This apparatus is arranged in a factory designed for that purpose and, however close this may be to the crop field, a certain time must always elapse before the stabilization is effected, this time being sufficient for the development of considerable hydrolysis of the active principles of the roots due to the action of the ferments which they contain. The activity of these ferments is all the more considerable since at that moment the moisture content of the roots is very high (about 75 to 80%), and it may even show itself externally by a substantial natural heating of the roots.

Furthermore, between the moment at the factory when the treated roots are placed in the autoclave and the moment at which the alcohol begins to heat them and the moment at which the alcohol vapours effectively reach the heart of the mass with a sufficient concentration, in the cellular protoplasm of these roots, an appreciable latency time again elapses, sufficient in any case for the activity of the ferments to continue, and this effect increases with a gradual internal additional increase of the temperature of the roots. This activity of the ferments inevitably results in a not negligible hydrolysis of the active principles and also in a cellular plasmolysis.

Finally, after their stabilization, the roots are dried either at ordinary temperature or still better at 50° C., and during the course of this drying, the residual moisture which they still contain inevitably enables their ferments to continue their activity and therefore allows the hydrolysis and plasmolysis to continue.

The present invention has for its particular object a method of stabilization which has the result of overcoming these drawbacks.

In accordance with the method of the invention for the stabilization of roots of plants, especially for the purpose of obtaining extracts from these roots, the roots are immersed as soon as they are gathered and at the actual place of collection, in a bath of an appropriate solvent (propylene-glycol or the like) brought up to a temperature exceeding 100° C. and preferably at least equal to 120° C.

The use of propylene-glycol is not essential. Other alcohols, polyalcohols or polyols having a boiling point higher than 100° C. may also be employed, such as sorbitol, glucose, lactose, saccharose for example. It is also possible to employ other kinds of solvent, the only conditions being that these solvents:

(a) are solvents of the active principle or principles of the roots treated;
(b) that the difference between the melting temperature of the solvent and the boiling temperature of water is as great as possible, but however below the temperature at which the active principles of the roots treated are affected.

The operation carried out in this manner will be known hereinafter as a "frusion" in order to recall that it is at the same time similar to a frying operation in the cookery sense of the term and to an infusion at high temperature, giving rise to a solution of the thermo-stable active principles and a dehydration at the same time. It becomes nearer to the proper process of frying by the fact that the roots are abruptly exposed to a relatively-high temperature for a very short time. It is differentiated from this process by the fact that:

(a) the frusion is effected with the actual solvent of the active principle, in contradistinction to the oil used in frying, which must not dissolve the nutritive and therefore active principles of the food;
(b) in frusion, the solvent penetrates intimately into the tissues at high temperature, whereas on the contrary, when frying, the oil must not penetrate into the food but must, by virtue of its high temperature, form an impenetrable external crust.

A frusion treatment of this kind necessitates only the use of a bowl of solvent, propylene-glycol for example, into which the roots are immediately plunged as soon as they have been separated, freed from earth, washed and dried. In consequence, this treatment is easy to carry out at the actual place from which the crop is taken, the necessary heating being obtained for example by means of a portable gas heating apparatus. In this way, all transport of the fresh plants is avoided.

The temperature of the solvent bath is preferably held at at least 100° C. by intense heating during the whole time for which the roots are immersed therein, and the latter are only removed when the temperature of this bath has again reached at least 120° C. In practice, the roots to be treated are placed in a metal basket and this latter is plunged into the bath of solvent at 120° C. Thus, the roots are so to speak seized, and the abrupt increase of temperature which takes place to the heart of the roots ensures a very rapid evaporation of the major part of the water which they contain, with bursting of the cells of the roots and therefore liberation of their active principles. These latter are therefore solubilized in an anhydrous medium and the greater part of the water is evaporated, carrying away with it a certain quantity of solvent. Hence the term "concentrates" which is employed later.

By this method of abrupt steeping, the cellular fermentation is reduced to a considerable extent by practically eliminating the time necessary for heating to the heart of the roots.

According to an additional arrangement of the invention, after they have been removed from the bath of solvent, propylene glycol for example, the roots are ground and put into a press, the compressed cake of ground roots thus obtained being put into contact with chloroform diluted in a second bath of solvent, propylene-glycol for example, which has the object of compensating for the portion evaporated and, utilized in several fractions, of completely washing the dissolved active principles of the cake out of it. In order to enable the viscosity of the glycol or polyol employed to be reduced and to permit better compression of the cake, it is possible to utilize a removable alcohol, for example ethanol, in terminating the pressing of the cake.

The chloroform has the object of immediately paralyzing any function, and thereby fixes the ferments. In this way, there is reduced still further the risk of possible hydrolysis which would be due to the very small remaining content of "bound water" in the tissues of the treated roots.

The choice of the use of chloroform proves to be particularly favorable, since it acts as a very rapid poison of the cellular protoplasm, capable of potentiolizing the antiseptic, fungicide and antifermentation action of the poly-propylene-glycol. In addition, this cellular poison has little effect on human beings and has no action on the hepatic cell at the rate of dilution employed. It is easy to eliminate and can dissolve lipophilous bodies capable of having an action on the nervous system, which is advantageous in the case of plants having a neurotropic activity, such as valerian. It is a good solvent of organic bodies, its relatively-low boiling temperature and its low vapour pressure enabling it to act early in the cold state, in the form of vapour, by a kind of mordant action.

However this may be, the stabilization obtained by application of the method according to the invention proves to be particularly effective. Everything takes place in fact as if the water of constitution of the tissues of the roots of fresh treated plants were replaced by anhydrous solvents.

The present invention has also for its object any one of the concentrates, glycol extracts, polyol extracts or the like obtained from the application of the present method.

There is the case for example of the concentrate constituted by the bath of solvent utilized for the frusion of the roots, hereinafter known as the primary concentrate or glycol extract; of the concentrate derived from the compression of the roots in a press after the bath in question, hereinafter known as the secondary concentrate or glycol extract; and of the solvent-chloroform mixture which has served in washing the cake of roots obtained after this treatment in the press, known hereinafter as the tertiary concentrate or glycol extracts. The whole of the concentrates or glycol extracts obtained is then adjusted so as to obtain weight for weight of fresh plants.

The present invention has more precisely for its object the root extract constituted by the general concentrate or glycol extracts, known hereinafter as the overall concentrate or glycol extracts obtained by combining the primary, secondary and tertiary concentrates or glycol extracts referred to above.

The direct production according to the invention of a fluid extract and not a dry plant is particularly advantageous. In fact, a dry plant such as those usually obtained after passing through the autoclave, is much more difficult to utilize subsequently, since such use generally necessitates a lixiviation, preceded by the usual phases of inhibition and maceration. Now, this new inhibition naturally facilitates the hydrolysis of the active principles of the plant and therefore the modification and even the destruction of these active principles.

Preferably but not necessarily, the method according to the invention is carried out in such manner that the overall concentrate or glycol extracts obtained shall correspond weight for weight to the fresh plants treated and that the final content of chloroform in this overall concentrate or glycol extract may preferably be in the vicinity of 0.2% of the overall concentrate or glycolate.

For this purpose, it is only necessary to utilize for the formation of the primary concentrate or glycol extract a bath of solvent, propylene-glycol or the like, the weight of which is substantially equal to that of the whole of the roots to be treated, these being only immersed in the said bath fraction by fraction.

Emphasis has been laid above on the advantages which are generally to be obtained by producing in a fluid form the desired plant extract, as is proposed by the present invention.

It will of course be understood that if necessary it is possible to convert such a fluid extract to a dry extract. For that purpose, it is only necessary to evaporate this fluid extract to dry at 80° C. for about 48 hours. Or alternatively, it is possible, starting from frusioned plants and primary concentrate or glycol extract, to simplify the extraction of the secondary and tertiary concentrates or glycol extracts by a single extraction in an industrial apparatus of the Soxhlet type, such as that sold commercially by the Stoke Machine Company, under reduced pressure, enabling the propylene-glycol to be vaporized at 120° C. in a closed circuit and thus permitting fluid extracts to be obtained at higher concentration as a dry extract. Similarly, it is also possible to evaporate this fluid extract in the same apparatus to the consistency of a soft extract, or alternatively to dry the concentrates or glycol extracts in "atomizers" to the consistency of a dry extract, or by any other method, the main characteristic of the invention being especially constituted by the frusion.

The method of stabilization described above is obviously applicable to the treatment of any rhizome or other similar plant root.

However, the present invention is more particularly but not exclusively directed to its application to the preparation of an extract of valerian.

The present invention has therefore as a further object, an extract or concentrate of valerian, a glycol extract, polyol extract or the like, obtained by the application of the present method.

By way of example, there will now be explained a detailed method of operation suitable for carrying into effect the method according to the invention.

On the actual field from which is gathered the crop of roots to be treated are arranged a table with a number of chopping knives to separate the rhizomes from their coma and to divide these rhizomes into several parts having a maximum section of about 10 mm.; a tank filled with water for freeing the roots from the remaining earth which may still be attached to them; a centrifuging machine with a separate motor for drying the roots; one or more tanks each containing about 100 kg. of propylene-glycol and each being heated by means of an independent burner, for example by means of a portable fuel gas burner; and a number of baskets of stainless steel mesh having such dimensions as to enable them to be individually immersed in any one of the said tanks.

With this equipment, it is intended to treat about 100 kg. of fresh roots for each treatment tank, in successive fractions each corresponding to the contents of one basket.

After washing and drying the roots, the rootlets are separated from the bodies and then, the metal basket being placed in the frusioning tank, the roots are immersed in fractions in such manner that they are all "seized" at 120° C., as and when they fall into the bath.

In the last place, a metal cover provided with a weight forces the roots into the bath, and the water of constitution is immediately vaporized in bubbles which pass at once out of the roots.

On the other hand, in order to homogenize the bath, the basket is lifted and lowered from time to time so as to cause the glycol to criculate through the centre of the mass; there is then a period of waiting until the temperature rises to at least 120° C. This rise in temperature is in effect an indication of the good evaporation of the water of constitution from the cells of the said root bodies.

The basket is then drained and the root bodies are stored in that state in suitable barrels.

The same operations are repeated until all the root bodies have thus been scalded.

The same procedure is then applied to the rootlets which are installed in turn in metal baskets so as to be immersed in propylene-glycol at 120° C. and which are not removed until the temperature of this bath has again reached that value.

In the course of this operation, care will be taken that all the rootlets are immersed in the propylene-glycol bath by applying against their surface a metal plate loaded with a weight.

When the operation of frusion of the rootlets is complete, these are stored as previously, in storage barrels.

When the 100 kg. of fresh roots have thus been treated, that is to say stabilized by frusion, the propylene-glycol utilized is put to one side and constitutes the glycol extract known above as primary glycol extract.

The evacuation of the primary glycolate and of the roots thus treated is then carried out to the factory, in which after cooling, these roots are ground.

These ground roots are then put into a press and the fraction of propylene-glycol squeezed out is put to one side and constitutes the glycolate known above as the secondary glycol extract.

The compressed cake of ground roots is then taken from the press and diluted with a fraction of the quantity of propylene-glycol necessary to complete the preparation to its weight of fresh plants and comprising 0.2% of chloroform in the final glycol extract or 0.2% by weight of the fresh plants.

As has been specified above, the chloroform has the advantageous effect of preventing any fermentation or subsequent microbic development of the "bound water" of the roots, which, during the increase in temperature in course of the scalding of the said roots, has not been evaporated in those cells of the roots which are most difficult to reach.

The whole of the ground roots and this second bath of propylene-glycol with a small content of chloroform, is then again passed into the press; the remaining fractions of propylene-glycol are utilized in the same way, by spraying the cake and washing it in each fraction until it has been completely freed from its active principles. The whole of the glycol extracts thus squeezed out is then put on one side; this constitutes the tertiary glycol extract.

The primary, secondary and tertiary glycol extracts are then combined and, if the operations have been carried out as explained above, there is thus obtained a glycol extract, known as the overall glycol extract which corresponds weight for weight to the mass of fresh root treated, namely 100 kg. and containing 0.20 kg. of chloroform.

It should be noted that the whole of the primary glycol extract and the 100 kg. of fresh roots can be preserved for many years and the subsequent phases of the preparation may be carried out a very long time after.

Generally speaking, the fluid extracts of plants thus obtained have an activity which is definitely higher for a quantity initially similar of fresh roots or an identical dry residue to that of the usual corresponding dry extracts of commerce.

In the case for example of valerian extracts, this higher activity can readily be verified by checking the action of such extracts on the behaviour of male Siamese fighting fish, *Betta splendens*, following the method of observation described by V. Kempinskas in the following publication: "Change in the behaviour of Siamese Fighting Fish *Betta splendens* Under the Action of Aminazine, Barbamyl and the Maceration of Valerien." List. TSR Ankstuju Mokyklu. Darb. Medicina (1963), IV, pages 173–177.

There will be described below an observation of this kind intended to compare the action of a glycol extract according to the invention, reference LG 120, with a commercial fluid extract, reference F–2421. This comparison is also made with an inactive extract, namely a soft extract of couch grass, intended to permit a colour test to be made.

In all cases, the active doses utilized were those corresponding to 0.30 gram of dry extract of valerian per litre of water serving as the fish bath, and to eliminate the action of the solvents, the extracts were always evaporated to the dry state before being diluted in the water of the aquarium.

As regards the extract F–2421, which contains 5% pf. dry extract of valerian, 6 grams of such an extract were thus diluted with 1 litre of water. With reference to the glycol extract, reference LG–120, of which the dry extract obtained by evaporation to the dry state at 80° C. for 48 hours contains 2.36% of valerian extract, 13 grams of this were dissolved in 1 liter of water. For the soft extract of couch grass which contains 79.7% of dry extract, there was dissolved 0.37 gram per litre of water.

Measurements were first of all made on the average "spontaneous aggressivity time $t_{AS}$" of the fish, observed at the end of 5 minutes rest after placing in a first aquarium containing ordinary water and then a latency of 10 minutes rest behind an opaque glass, and finally a latency of 15 minutes rest. By "spontaneous aggressivity time" is meant the time at the end of which a fish, put into the presence of another fish of the same species, spontaneously shows its hositility to this latter.

The average of the times of spontaneous aggressivity thus observed permits a selection to be made, and any fish which does not have a rapidity of aggressivity less than one minute is eliminated.

Five fish thus selected are then put into a new aquarium containing the valerian extract under test and the average time "$t_{SA}$" indicating the elimination of aggressivity of these five fish is measured.

The same five fish are then placed in another aquarium containing ordinary water and the time "$t_{RA}$" at the end of which their aggressivity again appears, is measured.

The following conditions were observed in all the cases of test:

The aggressivity is measured without any interposed glass: a first indicator sign of aggressivity is the curving of the fishes body to the shape of an S, by hugging the body of the adversary fish, but it is only when the gills of the fish are open that it is considered that the reaction of aggressivity is positive.

The end of the aggressivity is obtained by the interposition of an opaque plate of opaline glass in order to avoid any liberation of active principles from the plastifying agent of plastic materials.

The fish tested were not subjected to any test, or preliminary intoxication by tranquilizing agents for at least one month previously, but the fish in which the latency time is greater than one minute were previously trained to fight several days before hand. The fish were all chosen of the same size, about 5 cm. in length, so as to have the same chances in fighting. They were all fed with living mud-worms at the rate of one or two per day, in order to avoid excessive feeding.

The temperature of the water in the aquariums was always 27° C. and the fight between the fish was always conducted with a good lighting.

The result of the test is summarized in the following table:

| Extract tested | $t_{AS}$ of fish tested in ordinary water, sec. | $t_{BA}$ in the extract tested, min. | $t_{RA}$ in ordinary water, min. | $t_{RA}/t_{BA}$ |
| --- | --- | --- | --- | --- |
| Commercial F-2421 | 23 | 530+ | 235 | 0.45 |
| Glycol extract LG-120 | 24 | 118+ | 159 | 1.35 |
| Couch grass | 56 | 844+ | 103 | 0.12 |

As clearly shown in the above table, the valerian glycol extract according to the invention, reference LG–120, slows-down the aggressive reactions of the *Betta splendens* fish tested, in a manner which is definitely superior, for an equivalent quantity of dry extract of valerian, to that of the commercial extract tested by way of comparison.

As is well known, the extracts of valerian have a large number of applications in therapeutics.

Thus, it has already been proposed to associate them with a barbiturate and more precisely with barbamyl.

The applicant has made two observations on this subject.

The first observation concerns the fact that in such associations, the barbiturate employed is potentialized when there is associated with it a glycol extract of valerian according to the invention, this glycol extract of valerian becoming itself potentialized by the barbiturate, so that the combined action of these two constituents is on the one hand definitely superior to the sum of their individual actions, and is on the other hand definitely superior to the action of comparable associations formed by means of the usual valerian extract.

The second observation concerns the fact that in such associations, and more particularly in the case of a glycol extract of valerian according to the invention, it is preferable to utilize as the barbiturate, not barbamyl or other bartiturates with a short action, but barbital.

It would appear in fact that the valerian is much slower to act than the barbamyl and also that its effect is slower to disappear than that of this latter, which is not the case for barbital, the effect of which on the contrary takes time to become established and to be dissipated over periods comparable with those corresponding to valerian.

In addition, barbital advantageously requires for its solution the same quantity of propylene-glycol as the glycol extract of valerian according to the invention, necessary for its potentialization.

Thus, the present invention has also for its object a medicinal association generally characterized in that it comprises a barbiturate and glycol extract of valerian obtained in accordance with the above method, the said barbiturate being preferably barbital for example.

There are given below by way of example two particular compositions of a medicinal association of this kind.

EXAMPLE A

|  | G. |
| --- | --- |
| Barbital acid | 3 |
| Nicotinamide | 6 |
| Urea | 5 |
| Glycol extract of valerian [1] | 25 |
| Propylene-glycol [2] | 6 |
| Alcohol at 95° | 15 |
| Water, q.s.p. 100 ml. | |

[1] Containing at least 79% of propylene-glycol.
[2] Q.s.p. 25 grams to 100 ml. of the formula.

In a composition of this kind, the potentialization of the valerian and the barbital is easily shown by observing the effects of this composition on male *Betta splendens*, as described above.

EXAMPLE B

|  | Kg. |
| --- | --- |
| Concentrate of fluid valerian [1] | 22.6 |
| Sodium barbital | 3.8 |
| Alcohol at 95° | 5.0 |
| Water, q.s.p. 100 litres. | |

[1] Containing at least 79% of propylene-glycol.

EXAMPLE C

|  | G. |
| --- | --- |
| Barbital acid | 3 |
| Glycol extract of valerian [1] | 25 |
| Propylene-glycol [2] | 6 |
| Alcohol at 95° | 20 |
| 70% levulose syrup, q.s.p. 100 ml. | |

[1] Containing at least 79% of propylene-glycol.
[2] Q.s.p. 25 grams to 100 ml. of the formula.

EXAMPLE D

|  | G. |
| --- | --- |
| Barbital acid | 3 |
| Glycol extract of valerian [1] | 25 |
| Propylene-glycol | 6 |
| Nicotinamide | 4 |
| Alcohol at 96° | 20 |
| Demineralized water | 10 |
| Flavour, q.s. | |
| 70% levulose syrup, q.s.p. 100 ml. | |

[1] Containing at least 79% of propylene-glycol.

In compositions such as A, B or the like, the slow sedative action of the barbital advantageously completes the slow tranquilizing action of the valerian, in preference to the other barbiturates, the action of which is too short as compared with that of valerian.

It will of course be understood that the present invention is not limited to the methods of utilization described above, but includes any alternative form of execution. Thus, the bath of propylene-glycol which is used for the frusion of the roots may be brought to a temperature higher than 120° C., for example to 150° C.

What I claim is:

1. In a method of solvent-extracting valerian roots by gathering said roots from the ground, immersing the roots in a solvent to obtain a valerian extract, and then separating the roots from the extract thus obtained; the improvement in which the valerian roots as gathered from the ground have a moisture content of at least 75% by weight, and immediately after gathering immersing the roots at the actual place of gathering in a liquid bath of propylene glycol at a temperature of 120–150° C., said bath being at atmospheric pressure.

2. The method of claim 1, further comprising comminuting said extracted roots, and pressing said comminuted roots to obtain a secondary liquid, and combining said secondary liquid with said extract.

3. The method of claim 2, further comprising contacting said comminuted and pressed roots with formaldehyde, and then again pressing the comminuted roots to obtain a tertiary liquid, and combining said teritary liquid with said extract and said secondary liquid.

4. The method of claim 1 which is conducted batchwise with a quantity of roots about equal in weight to the weight of the solvent in said bath.

References Cited

Chemical Abstracts, vol. 50, item 14124d, 1956.
Chemical Abstracts, vol. 52, item 13842e, 1958.
Chemical Abstracts, vol. 52, item 14971g, 1958.
Chemical Abstracts, vol. 53, item 3386d–3387a, 1959.
Chemical Abstracts, vol. 53, item 3485c, 1959.
Chemical Abstracts, vol. 55, item 27660f, 1961.
Remington's Pharmaceutical Sciences, 13th ed., pp. 203, 486–97, Mack Pub. Co., Pa., 1965.
The Merck Index, 7th ed. pp. 718, 719, 1082, Merck & Co., Inc., N.J., 1960.

ALBERT T. MEYERS, Primary Examiner

D. B. MOYER, Assistant Examiner

U.S. Cl. X.R.

424—176, 254; 260—236.5, 705